United States Patent
Lee et al.

(10) Patent No.: US 12,284,148 B2
(45) Date of Patent: Apr. 22, 2025

(54) TOPIC SUGGESTION IN MESSAGING SYSTEMS

(71) Applicant: Microsoft Technology Licensing, LLC, Redmond, WA (US)

(72) Inventors: Webber Po-Wei Lee, Bellevue, WA (US); Daniil Sokolov, Bothell, WA (US); Jaclyn Ruth Elizabeth Phillips, Vancouver (CA); Yi Zhang, Kirkland, WA (US); Jennifer Oliva Ede, Everett, WA (US); Shoou-Jiun Wang, Sammamish, WA (US); Tracy My Tuyen Nguyen, Renton, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 398 days.

(21) Appl. No.: 17/744,243

(22) Filed: May 13, 2022

(65) Prior Publication Data

US 2023/0281389 A1    Sep. 7, 2023

Related U.S. Application Data

(60) Provisional application No. 63/315,741, filed on Mar. 2, 2022.

(51) Int. Cl.
*H04L 51/21* (2022.01)
*G06F 18/22* (2023.01)
(Continued)

(52) U.S. Cl.
CPC .............. *H04L 51/21* (2022.05); *G06F 18/22* (2023.01); *G06F 40/237* (2020.01);
(Continued)

(58) Field of Classification Search
CPC ...... G06F 40/279; G06F 40/237; G06F 40/35; G06F 18/22; G06F 11/3466; G06F 17/16; H04L 51/21; H04L 51/02
See application file for complete search history.

(56) References Cited

U.S. PATENT DOCUMENTS

| 8,458,195 | B1 | 6/2013 | Procopio |
| 8,515,058 | B1 * | 8/2013 | Gentry ................... H04L 9/008 380/28 |

(Continued)

FOREIGN PATENT DOCUMENTS

| AU | 2020268901 A1 | 11/2021 |
| CN | 110192246 A | 8/2019 |

(Continued)

OTHER PUBLICATIONS

Akari Asai, Eunsol Choi, "Challenges in Information-Seeking QA: Unanswerable Questions and Paragraph Retrieval", Jun. 2021, arXiv: 2010.11915v2 [cs.CL, ] (Year: 2021).*

(Continued)

*Primary Examiner* — Paras D Shah
*Assistant Examiner* — Nadira Sultana
(74) *Attorney, Agent, or Firm* — Weaver IP L.L.C.

(57) ABSTRACT

Embodiments are provided for suggesting topics in a messaging system. A set of queries is received from a chat transcript history, where the set of queries includes a set of unhandled queries, and each unhandled query comprises a query for which a bot did not identify a corresponding topic (e.g., queries that did not trigger selection of a topic by the bot). A vector representation is generated for each unhandled query in the set of unhandled queries. The vector representations for the set of unhandled queries are clustered to generate one or more clusters of vector representations, each cluster corresponding to a group of unhandled queries. A corresponding suggested topic is generated for each cluster (Continued)

and provided to an authoring tool that comprises one or more interactive elements to enable an author to select at least one of the suggested topics for implementation in the bot.

20 Claims, 7 Drawing Sheets

(51) Int. Cl.
  *G06F 40/237* (2020.01)
  *G06F 40/279* (2020.01)
  *G06F 40/35* (2020.01)
  *H04L 51/02* (2022.01)
(52) U.S. Cl.
  CPC ............ *G06F 40/279* (2020.01); *G06F 40/35* (2020.01); *H04L 51/02* (2013.01)

(56) References Cited

U.S. PATENT DOCUMENTS

| | | | |
|---|---|---|---|
| 8,630,961 | B2 | 1/2014 | Beilby |
| 9,143,468 | B1 | 9/2015 | Cohen |
| 9,275,038 | B2 | 3/2016 | Bierner |
| 9,658,824 | B1 * | 5/2017 | Shao ..................... G06F 16/248 |
| 9,710,539 | B2 | 7/2017 | Dey |
| 10,250,547 | B1 | 4/2019 | Jain |
| 10,366,168 | B2 | 7/2019 | Wu |
| 10,498,898 | B2 | 12/2019 | Mazza |
| 10,565,634 | B2 | 2/2020 | Talmor |
| 10,659,403 | B2 | 5/2020 | Smullen |
| 10,692,006 | B1 | 6/2020 | Zhang |
| 10,698,654 | B2 | 6/2020 | Loughrey |
| 10,708,216 | B1 | 7/2020 | Rao |
| 10,795,640 | B1 | 10/2020 | Knight |
| 10,848,443 | B2 | 11/2020 | Helmy |
| 10,861,022 | B2 | 12/2020 | Gupta |
| 10,949,454 | B2 | 3/2021 | Conley |
| 10,951,555 | B2 | 3/2021 | Wu |
| 10,958,779 | B1 | 3/2021 | Rule |
| 10,976,904 | B2 | 4/2021 | Moran |
| 10,991,361 | B2 | 4/2021 | Kwatra |
| 10,992,604 | B1 | 4/2021 | Knas |
| 11,030,412 | B2 | 6/2021 | Shanmugam |
| 11,036,941 | B2 | 6/2021 | Moss |
| 11,064,074 | B2 | 7/2021 | Erhart et al. |
| 11,074,415 | B2 | 7/2021 | Silverstein |
| 11,074,907 | B1 | 7/2021 | Mallikarjuniah |
| 11,080,490 | B2 | 8/2021 | Koohmarey |
| 11,113,475 | B2 | 9/2021 | Sampat |
| 11,128,579 | B2 | 9/2021 | Magliozzi |
| 11,138,978 | B2 | 10/2021 | Szymanski et al. |
| 11,146,509 | B2 | 10/2021 | Chen |
| 11,153,234 | B2 | 10/2021 | Wu |
| 11,157,490 | B2 | 10/2021 | Zhu |
| 11,159,457 | B2 | 10/2021 | Liang et al. |
| 11,176,466 | B2 | 11/2021 | Neogi |
| 11,184,298 | B2 | 11/2021 | Freed |
| 11,188,720 | B2 | 11/2021 | Croutwater et al. |
| 11,190,469 | B2 | 11/2021 | Erhart |
| 11,200,506 | B2 | 12/2021 | Wu et al. |
| 11,200,581 | B2 | 12/2021 | Williams et al. |
| 11,205,422 | B2 | 12/2021 | Kwatra |
| 11,212,241 | B1 | 12/2021 | Pace, Jr. |
| 11,226,997 | B2 | 1/2022 | Pinel |
| 11,227,342 | B2 | 1/2022 | Wu et al. |
| 11,243,991 | B2 | 2/2022 | Fincun |
| 11,250,216 | B2 | 2/2022 | Demme |
| 11,263,249 | B2 | 3/2022 | Layton |
| 11,275,901 | B2 | 3/2022 | Shek |
| 11,288,566 | B2 | 3/2022 | Liu |
| 11,301,916 | B1 | 4/2022 | Hayes |
| 11,343,208 | B1 * | 5/2022 | Shetty ..................... H04L 51/02 |
| 11,397,762 | B2 | 7/2022 | Raval Contractor |
| 11,416,682 | B2 | 8/2022 | Patel |
| 11,423,066 | B2 | 8/2022 | Ganu |
| 11,435,980 | B2 | 9/2022 | Byun |
| 11,487,948 | B2 | 11/2022 | Kaur |
| 11,501,211 | B2 | 11/2022 | Wu |
| 11,514,330 | B2 | 11/2022 | Ma |
| 11,516,153 | B2 | 11/2022 | Barrett |
| 11,551,143 | B2 | 1/2023 | Ganti |
| 11,552,909 | B2 | 1/2023 | Lopes de Moraes |
| 11,556,572 | B2 * | 1/2023 | Morris ..................... G06F 17/16 |
| 11,650,986 | B1 * | 5/2023 | Agbemabiese ... G06F 16/24553 |
| | | | 707/737 |
| 11,651,033 | B2 * | 5/2023 | Subramaniam ..... G06F 11/3466 |
| | | | 704/9 |
| 11,676,044 | B1 | 6/2023 | Mazza |
| 11,689,486 | B1 | 6/2023 | Bates |
| 11,777,880 | B2 | 10/2023 | Ramirez |
| 11,909,698 | B2 * | 2/2024 | Gollareddy ............. H04L 51/02 |
| 12,041,098 | B2 * | 7/2024 | B M S ................... H04L 65/403 |
| 2014/0279050 | A1 | 9/2014 | Makar |
| 2016/0124614 | A1 | 5/2016 | Bromberg |
| 2017/0213130 | A1 | 7/2017 | Khatri et al. |
| 2017/0300499 | A1 * | 10/2017 | Lev-Tov ............. G06F 16/3329 |
| 2018/0189273 | A1 | 7/2018 | Campos |
| 2018/0196796 | A1 * | 7/2018 | Wu ........................ G06F 40/289 |
| 2018/0239495 | A1 | 8/2018 | Sharifi |
| 2019/0068527 | A1 | 2/2019 | Chen |
| 2019/0199658 | A1 | 6/2019 | Kim et al. |
| 2019/0213528 | A1 | 7/2019 | Gupta |
| 2019/0260694 | A1 | 8/2019 | Londhe |
| 2019/0354557 | A1 | 11/2019 | Kornblit |
| 2020/0137001 | A1 | 4/2020 | Wu |
| 2020/0193966 | A1 * | 6/2020 | Chakravarthy ......... G06F 40/56 |
| 2020/0267112 | A1 | 8/2020 | Jain et al. |
| 2020/0342032 | A1 | 10/2020 | Subramaniam et al. |
| 2020/0387567 | A1 | 12/2020 | Loforte |
| 2021/0029249 | A1 | 1/2021 | Erhart |
| 2021/0092078 | A1 | 3/2021 | Lee |
| 2021/0150150 | A1 | 5/2021 | Wu |
| 2021/0203623 | A1 | 7/2021 | Zhou |
| 2021/0209441 | A1 | 7/2021 | Sivakumar |
| 2021/0295203 | A1 | 9/2021 | Liao |
| 2021/0382925 | A1 | 12/2021 | Fincun |
| 2021/0397610 | A1 | 12/2021 | Singh et al. |
| 2021/0406473 | A1 | 12/2021 | Park |
| 2022/0075947 | A1 | 3/2022 | Swvigaradoss et al. |
| 2022/0076283 | A1 | 3/2022 | Oliveira |
| 2022/0374604 | A1 | 11/2022 | Sivakumar |
| 2023/0004718 | A1 | 1/2023 | Helvik |
| 2023/0169966 | A1 | 6/2023 | Chong |
| 2023/0186034 | A1 * | 6/2023 | Casper ..................... H04L 51/04 |
| | | | 704/9 |
| 2023/0283582 | A1 | 9/2023 | Bates |
| 2023/0289838 | A1 | 9/2023 | Oliveira |

FOREIGN PATENT DOCUMENTS

| | | | |
|---|---|---|---|
| CN | 111557002 | A | 8/2020 |
| CN | 112306708 | A | 2/2021 |
| EP | 3776175 | A1 | 2/2021 |
| IN | 202041028027 | A | 1/2020 |
| IN | 202014031517 | A | 1/2021 |
| IN | 202014031538 | A | 1/2021 |
| IN | 202014031539 | A | 1/2021 |

OTHER PUBLICATIONS

D'Souza-Wiltshire, et al., "Create Topics from Existing Online Support Content", Retrieved from: https://docs.microsoft.com/en-us/power-virtual-agents/advanced-create-topics-from-web, Feb. 16, 2022, 10 Pages.

Zhang, Jeff, "AI-assisted authoring: detect topic overlaps and get topic suggestions from bot sessions", Retrieved from: https://powervirtualagents.microsoft.com/en-us/blog/ai-assisted-authoring-detect-topic-overlaps-and-get-topic-suggestions-from-bot-sessions/, Jun. 22, 2021, 4 Pages.

Non-Final Office Action mailed on Dec. 19, 2023, in U.S. Appl. No. 18/316,458, 23 pages.

(56) References Cited

OTHER PUBLICATIONS

Batir, Sean, "How to Make a Simple Chatbot", Retrieved from: https://towardsdatascience.com/how-to-make-a-simple-chatbot-841b5efa2094, Jul. 7, 2020, 12 pages.
Notice of Allowance Issued in U.S. Appl. No. 17/744,241, Mailed Date: Feb. 17, 2023, 14 Pages.
Notice of Allowance mailed on Apr. 11, 2024, in U.S. Appl. No. 18/316,458, 16 pages.
U.S. Appl. No. 17/744,241, filed May 13, 2022.
U.S. Appl. No. 18/316,458, filed May 12, 2023.

* cited by examiner

TOPIC SUGGESTION IN MESSAGING SYSTEMS

CROSS-REFERENCE TO RELATED APPLICATIONS

This application claims priority to U.S. Provisional Patent Application No. 63/315,741, filed on Mar. 2, 2022, entitled "Topic Overlap Detection and Topic Suggestion Tools," the entirety of which is incorporated by reference herein.

BACKGROUND

Messaging systems, such as chat bots, may be utilized in a variety of contexts to simulate natural conversations with humans. In typical systems, a user query is parsed to identify a topic that best aligns with the query. Based on the identified topic, the chat bot provides a response to the user.

In existing systems, a user query may not align with any particular topic. In such situations, the user and the chat bot may need to engage in additional dialog in an attempt to elicit an appropriate response from the chat bot. Despite the additional dialogue, the chat bot may still be unable to identify an appropriate topic that aligns with the user's query, resulting in a poor overall performance and usability of the chat bot.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for generating topic suggestions from chat transcripts. In an example system, a query representation generator is configured to receive a set of queries from a chat transcript history that comprises at least a partial transcript of one or more conversations involving a bot, where the set of queries includes a set of unhandled queries, and each unhandled query comprises a query for which the bot did not identify a corresponding topic (e.g., queries that did not trigger selection of a topic by the bot). The query representation generator is further configured to generate a vector representation for each unhandled query in the set of unhandled queries. A query representation clusterer is configured to cluster the vector representations for the set of unhandled queries to generate one or more clusters of vector representations, each cluster corresponding to a group of unhandled queries. A topic suggester is configured to generate a corresponding suggested topic for implementation in the bot for each cluster, and provide each suggested topic to an authoring tool. In examples, the authoring tool comprises one or more interactive elements to enable an author to select at least one of the suggested topics for implementation in the bot. In this manner, additional topics related to queries that were not previously handled by a bot may be generated and suggested for future use by the bot (e.g., for inclusion or implementation in the bot).

Further features and advantages of the disclosed subject matter, as well as the structure and operation of various example embodiments, are described in detail below with reference to the accompanying drawings. It is noted that the disclosed subject matter is not limited to the specific embodiments described herein. Such example embodiments are presented herein for illustrative purposes only. Additional example embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate example embodiments of the present application and, together with the description, further serve to explain the principles of the example embodiments and to enable a person skilled in the pertinent art to make and use the example embodiments.

Figure 1:
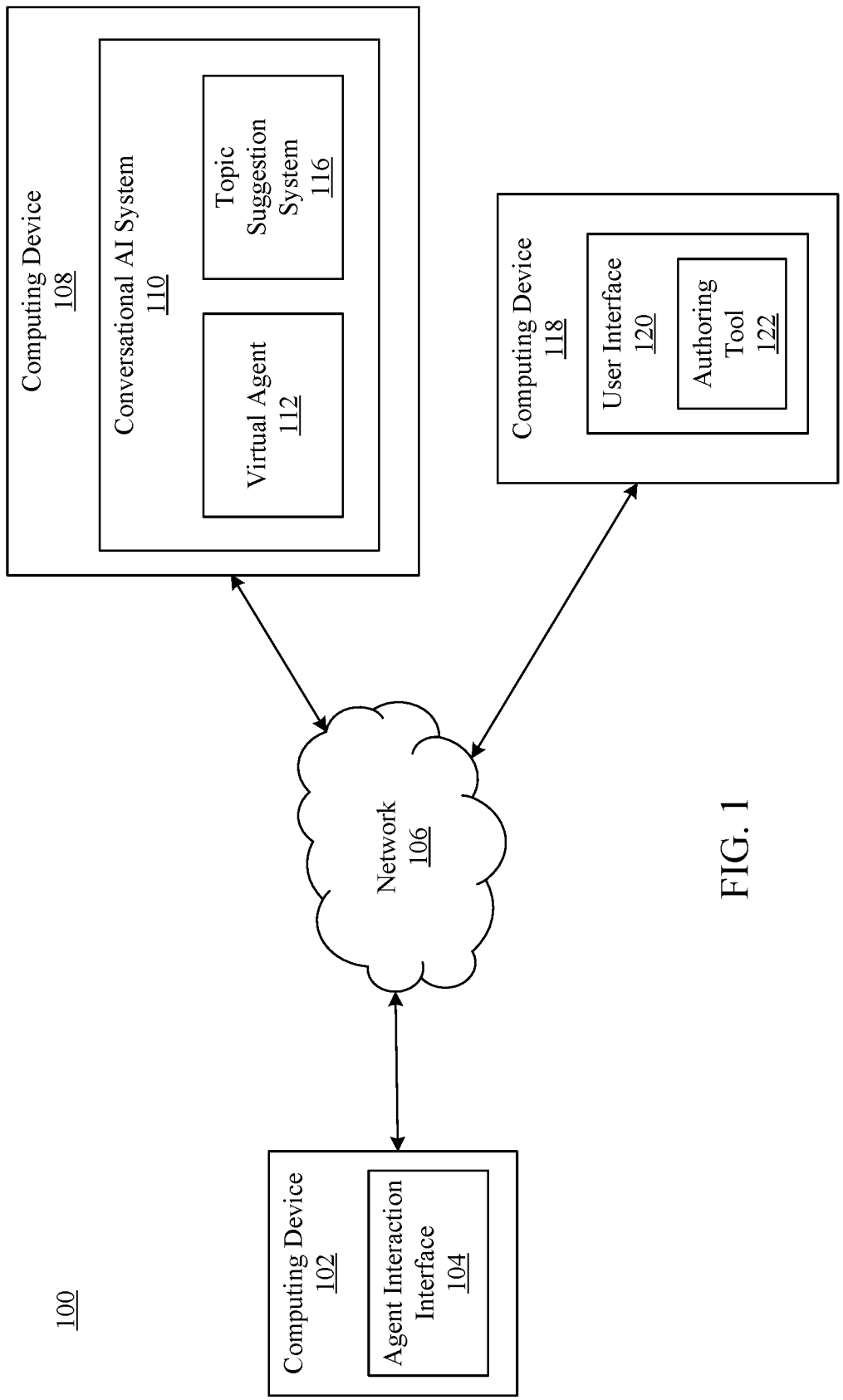
FIG. 1 shows a block diagram of a messaging system, according to an example embodiment.

The features and advantages of the disclosed subject matter will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more example embodiments that incorporate the features of the disclosed subject matter. The scope of the disclosed subject matter is not limited to the example embodiments described herein. The example embodiments merely exemplify the disclosed subject matter, and modified versions of the disclosed embodiments are also encompassed. Example embodiments are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, should be understood to mean that the condition or characteristic is defined to within tolerances that are acceptable for operation of the example embodiment for an application for which it is intended.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on."

Numerous example embodiments are described as follows. It is noted that any section/subsection headings provided herein are not intended to be limiting. Example embodiments are described throughout this document, and any type of embodiment may be included under any section/subsection. Furthermore, example embodiments disclosed in any section/subsection may be combined with any other embodiments described in the same section/subsection and/or a different section/subsection in any manner.

II. Example Implementations

Messaging systems, such as chat bots, may be utilized in a variety of contexts to simulate natural conversations with humans. In typical systems, a user query is parsed to identify a topic that best aligns with the query. Based on the identified topic, the chat bot provides a response to the user.

In existing systems, a user query may not align with any particular topic. In such situations, the user and the chat bot may need to engage in additional dialog in an attempt to elicit an appropriate response from the chat bot. Despite the additional dialogue, the chat bot may still be unable to identify an appropriate topic that aligns with the user's query, resulting in a poor overall performance and usability of the chat bot.

Embodiments described herein address these and other issues by providing methods, systems, apparatuses, and computer program products for suggesting a topic in a messing system. In an example system, a query representation generator is configured to receive a set of queries from a chat transcript history that comprises at least a partial transcript of one or more conversations involving a bot, where the set of queries includes a set of unhandled queries, and each unhandled query comprises a query for which the bot did not identify a corresponding topic (e.g., queries that did not trigger selection of a topic by the bot). The query representation generator is further configured to generate a vector representation for each unhandled query in the set of unhandled queries. A query representation clusterer is configured to cluster the vector representations for the set of unhandled queries to generate one or more clusters of vector representations, each cluster corresponding to a group of unhandled queries. A topic suggester is configured to generate a corresponding suggested topic for implementation in the bot for each cluster, and provide each suggested topic to an authoring tool. In examples, the authoring tool comprises one or more interactive elements to enable an author to select at least one of the suggested topics for implementation in the bot. In this manner, additional topics related to queries that were not previously handled by a bot may be generated and suggested for future use by the bot (e.g., for inclusion or implementation in the bot).

Generating and/or suggesting topics for inclusion in a messaging system as described herein has numerous advantages, including but not limited to overall improvement of the functioning of a messaging tool. For instance, suggestion of additional topics based on actual chat transcripts representative of real-world user queries may lead to an overall improvement of the functioning of a conversational AI system. For instance, by suggesting such additional topics, the conversational AI system may improve the simulation of human conversation by accurately responding to user queries with appropriate information (rather than engaging in a conversation in which a topic has not been selected by the virtual agent), thereby reducing the likelihood that the system asks a clarifying question or questions to attempt to identify a topic the user is interested in discussing. In other words, because such techniques may enable more accurate parsing of user queries, the conversational AI system may better and more efficiently interact with users. As a result, techniques described herein may provide improvements to the conversational AI system itself.

Furthermore, example embodiments described herein also improve the functioning of the computing systems and/or networks on which a conversational AI system is receiving or sending messages. For instance, because additional topics may be suggested based on chat transcripts (e.g., representative of actual user queries), additional clarifying questions (e.g., a question asking the user which topic the user is interested in) need not be generated and asked by the AI system, thereby improving the performance of the conversational AI system. Such a reduction in these types of questions reduces the number of processing cycles used by the computing device(s) on which the conversational AI system operates and the user's computing device that receives and presents those messages from the AI system. Furthermore, reducing the need for these additional clarifying questions also reduces the amount of memory needed to store additional message information as well as the amount of data transmitted over a network between the AI system and the user. As a result, utilization of processing resources, memory resources, and networking resources may be improved in accordance with techniques described herein.

Example embodiments are described as follows for systems and methods for suggesting topics in a messaging system (e.g., a conversational AI system). For instance, FIG. 1 shows a block diagram of a messaging system, according to an example embodiment. As shown in FIG. 1, system 100 includes a computing device 102, a computing device 108, and a computing device 118. Computing device 102 includes an agent interaction interface 104. Computing device 108 includes a conversational AI system 110. Conversational AI system 110 includes a virtual agent 112 and a topic suggestion system 116. Computing device 118 includes a user interface 120. User interface 120 includes an authoring tool 122. Computing device 102, computing device 108, and computing device 118 may be communicatively coupled by a network 106. An example computing device that may incorporate the functionality of computing device 102, computing device 108, and computing device 118 (or any subcomponents therein, whether or not illustrated in FIG. 1) is described below in reference to FIG. 8. It is noted that system 100 may comprise any number of devices, including those illustrated in FIG. 1 and optionally one or more further devices or components not expressly illustrated. System 100 is further described as follows.

Network 106 may include one or more of any of a local area network (LAN), a wide area network (WAN), a personal area network (PAN), a combination of communication networks, such as the Internet, and/or a virtual network. In example implementations, computing device 102, computing device 108, and computing device 118 communicate via network 106. In an implementation, any one or more of computing device 102, computing device 108, and computing device 118 communicate over network 106 via one or more application programming interfaces (API) and/or according to other interfaces and/or techniques. Computing device 102, computing device 108, and computing device 118 may each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Computing device 102 includes one or more computing devices of one or more users (e.g., individual users, family users, enterprise users, governmental users, etc.) that each comprise one or more applications, operating systems, virtual machines, storage devices, etc. that may be used to interact with virtual agent 112. Computing device 102 may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as an Apple iPhone, a phone implementing the Google® Android™ operating system, a Microsoft Windows® phone, etc.), a wearable computing device (e.g., a head-mounted device including smart glasses such as Google® Glass™, Oculus Rift® by Oculus VR, LLC, etc.), or other type of stationary or mobile device. Computing device 102 is not limited to a physical machine, but may include other types of machines or nodes, such as a virtual machine. Computing device 102 may interface with other components illustrated in FIG. 1 through APIs and/or by other mechanisms.

Agent interaction interface 104 may comprise any user interface through which interaction with virtual agent 112 may be carried out. In examples, agent interaction interface 104 may comprise an application (e.g., a web browser, a chat application, a text-messaging application, an email application, etc.), an add-on or plug-in to an application, a service that is accessed or triggered upon performing an action on computing device 102 (e.g., visiting a website), or an application or service that is accessed on computing device 102 in other ways. Agent interaction interface 104 may comprise one or more interactive user interface (UI) elements that enable user interaction with a virtual agent 112. Examples of such UI elements include, but are not limited to, a text input portion, a message displaying portion, drop-down menu, one or more radio or other selectable buttons, icons, a listing, or other UI elements that enable the transmission and/or receipt of messages to and/or from another entity, such as virtual agent 112 that may comprise a chat bot.

For instance, agent interaction interface 104 may transmit one or more user-generated phrases (e.g., user queries or other interactions) inputted therein to virtual agent 112. In some examples, agent interaction interface 104 may comprise an interface (e.g., an interface associated with an organization) via which a user may provide user queries (e.g., customer support requests, etc.) to virtual agent 112.

Agent interaction interface 104 may also be configured to receive one or more responses from virtual agent 112 in response to the user queries, such as messages, purchase confirmations, booking confirmations, emails, etc. These examples are only illustrative, and other types of communication between a user and another entity are contemplated.

Computing device 108 comprises one or more computing devices, servers, services, local processes, remote machines, web services, home assistant devices, virtual assistants, gaming consoles, entertainment systems, etc. for managing the messaging between one or more virtual agents (e.g., chat bots) and one or more users accessing agent interaction interface 104. For instance, computing device 108 may comprise a local computing device, a server coupled to an organization's network, a remotely located server, a collection of computing devices such as a network-accessible server (e.g., a cloud computing server network), or any other device or service that may manage the messaging between entities shown in FIG. 1 (and/or other entities not expressly shown).

Conversational AI system 110 comprises a messaging or other communication system that is semi-automated or fully automated. In some implementations, conversational AI system 110 may be configured to receive a query or other interaction from a user (e.g., user of agent interaction interface 104) and provide a response to agent interaction interface 104. As shown in FIG. 1, conversational AI system 110 includes a virtual agent 112 and a topic suggestion system 116.

Virtual agent 112 may comprise one or more services in which an automated or semi-automated interaction service may be implemented, such as an artificial intelligence software program that may employ natural language processing techniques to simulate human interaction with end users (e.g., responding with information in a messaging interface, carry out one or more requested tasks, look up order or account information, etc.). In example implementations, virtual agent 112 may be configured to simulate human interaction via applications of one or more language models to parse received user queries and determine an appropriate message in response. In some example embodiments, virtual agent 112 comprises a chat bot for simulating human conversation with a user. In implementations, virtual agent 112 may be configured to select a topic for conversation by identifying a trigger phrase that matches (e.g., identically or semantically) a received user query. In response to identifying a matching trigger phrase, virtual agent 112 may determine a topic for conversation with the user, and provide appropriate messaging in response (e.g., assisting with placing an order, looking up a reservation, etc.). Virtual agent 112 may comprise any interaction method, including but not limited to textual interaction (e.g., two-way messaging) and/or audible interaction (e.g., automated voice or speech interactions such as in automated telephone systems). It is also noted that disclosed techniques may be implemented in other contexts, such as parsing search queries (e.g., inputted to a website) that are matched to triggers in order to return an appropriate set of results (e.g., pages, categories, products, etc.) to a user.

Topic suggestion system 116 is configured to generate topic suggestions, as described in greater detail below. In example implementations, topic suggestion system 116 may generate one or more topic suggestions based on chat transcripts, such as by analyzing transcripts to identify unhandled queries therein (e.g., queries for which virtual agent 112 was unable to match to any particular topic). Topic suggestion system 116 may utilize an unsupervised clustering algorithm to cluster similar unhandled queries together and thereby identify additional topics for suggestion for providing to authoring tool 122. Authoring tool 122 may show the additional topics in a manner that enables users to select a particular topic identified by topic suggestion system 116, view the queries that contributed to identification of the suggested topic, and/or edit potential trigger phrases that may be used to trigger selection of the suggested topic for conversion by virtual agent 112 for future conversations. Additional details relating to the operation of topic suggestion system 116 will be described in greater detail below.

Although not shown in FIG. 1, conversational AI system 110 may also include a testing interface. For instance, the testing interface may comprise a testing environment in which an author may provide test or sample queries to virtual agent 112 to evaluate its performance. The testing interface may enable an author or other individual to engage in a simulated conversation with virtual agent 112. The conversation may comprise a test query that includes a trigger phrase provided to virtual agent 112 to determine whether the test query results in virtual agent 112 identifying a topic for conversation, or whether the test query results in virtual agent 112 failing to associate the query with any authored topic. For instance, where a test query indicates that virtual agent 112 fails to associate the query with any authored topic, authoring tool 122 may be utilized to make a change to one more or topics and/or associated trigger phrases to increase the likelihood that virtual agent 112 identifies a topic for the test query or similar queries. The testing interface may be provided for presentation and/or interaction in authoring tool 122 or elsewhere in UI 120 such as a window, pane, overlay, etc.

Computing device 118 includes one or more computing devices that comprise one or more applications, operating systems, virtual machines, storage devices, etc. that may be used to manage the operation and/or functionality of conversational AI system 110. Computing device 118 may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as an Apple iPhone, a phone implementing the Google® Android™ operating system, a Microsoft Windows® phone, etc.), a wearable computing device (e.g., a head-mounted device including smart glasses such as Google® Glass™, Oculus Rift® by Oculus VR, LLC, etc.), or other type of stationary or mobile device. Computing device 118 is not limited to a physical machine, but may include other types of machines or nodes, such as a virtual machine. Computing device 118 may interface with other components illustrated in FIG. 1 through APIs and/or by other mechanisms.

User interface (UI) 120 includes one or more UI elements that enable customization and/or management of one or more features of conversational AI system 110. For instance, UI 120 may comprise an interface that includes one or more interactive UI elements that enable the configuration (e.g., by a user) of aspects of conversational AI system 110 as described herein. In implementations, UI 120 may be accessed via a web browser by navigation to a web page, via an application stored on computing device 118, or other similar techniques. These examples are only illustrative, and UI 120 may provide any type, number, and/or arrangement of elements to manage and/or customize the manner in which conversational AI system 110 operates. Further, in some other implementations, any of the features described herein relating to the operation of conversational AI system 110 may also be configured in other ways, such as programmatically.

Authoring tool 122 may comprise an interface that provides a user with the ability to author and/or modify various aspects of conversational AI system 110. For instance, authoring tool 122 may comprise one or more UI elements for viewing, rewriting (e.g., modifying), creating and/or removing trigger phrases, topics, prompts, responses, or any other aspect that defines how virtual agent 112 operates. A trigger phrase includes one or more sets of words that, if included in a user query, triggers virtual agent 112 to select a particular topic for conversation for responding. A topic may include any subject or category for which virtual agent 112 can engage in simulated interaction. A single topic may be associated with a plurality of phrases, that when received by virtual agent 112, are configured to trigger the virtual agent to select the topic for conversation. As an illustrative example, the trigger phrases "suspend subscription" or "cancel subscription renewal" could be assigned to a topic of "cancel subscription." Any number of trigger phrases and/or topics may be defined via authoring tool 122.

It is also noted that authoring tool 122 need not receive authoring information from users. In some other implementations, authoring tool 122 may be configured to import authoring information (e.g., trigger phrases, topics, and/or any other authoring information that defines how virtual agent 112 operates) from a file, another computing device, or via any other means. Furthermore, authoring tool 122 may provide one more UI elements to view, modify, create, and/or remove any authoring information that defines how virtual agent 112 operates (e.g., rewriting existing topics or trigger phrases, adding new ones, etc.). Still further, authoring tool 122 may comprise one or more UI elements that enable an author to selectively enable or disable certain features of conversational AI system 110, such as topic suggestion system 116 (or any of the features contained therein).

In example embodiments, authoring tool 122 displays information generated by topic suggestion system 116. For instance, authoring tool 122 may present information relating to one or more suggested topics generated by topic suggestion system 116. For instance, authoring tool 122 may identify a listing of suggested topics for inclusion in conversational AI system 110, user queries that contributed to the generation of each suggested topic, and/or one or more suggested trigger phrases corresponding to the suggested topic. Authoring tool 122 may comprise one or more interactive elements that, when selected, may be used to view, edit and/or implement any such suggested topics or trigger phrases for use in conversational AI system 110 (e.g., by virtual agent 112 for future conversations).

It is noted that implementations are not limited to the illustrative arrangement shown in FIG. 1. For instance, computing device 102, computing device 108, and/or computing device 118 need not be separate or located remotely from each other. In some examples, any one or more of computing device 102, computing device 108, and/or computing device 118 (or any subcomponents therein) may be located in or accessible via the same computing device or distributed across a plurality of devices. For instance, techniques described herein may be implemented in a single computing device. Furthermore, system 100 may comprise any number of computing devices, virtual agents, networks, servers, or any other components coupled in any manner.

Topic suggestion system 116 may operate in various ways to suggest topics in a messaging system. For instance, FIG.

Figure 2:
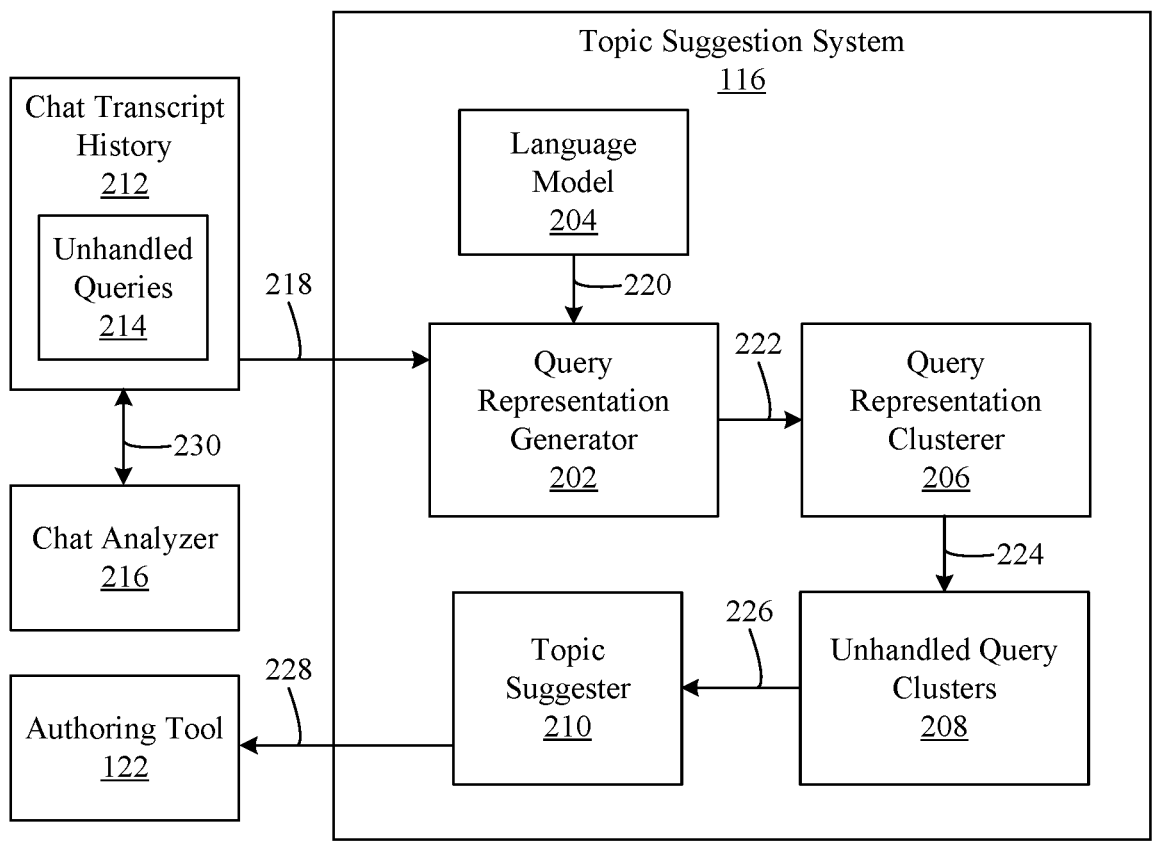
FIG. 2 shows a block diagram of a system for generating suggested topics in a messaging system, according to an example embodiment.

2 shows a block diagram of a system for generating suggested topics in a messaging system, according to an example embodiment. As shown in FIG. 2, system 200 includes an example implementation of topic suggestion system 116 and authoring tool 122. System 200 also includes a chat transcript history 212 and a chat analyzer 216. Topic suggestion system 116 includes a query representation generator 202, a language model 204, a query representation clusterer 206, a set of unhandled query clusters 208, and a topic suggester 210. Chat transcript history 212 includes a set of unhandled queries 214. Each of these components of system 200 are described in further detail as follows.

In examples, chat transcript history 212 comprises a history (e.g., a partial or full transcript) of one or more conversations between users and virtual agent 112. For instance, chat transcript history 212 may include content (e.g., text, multimedia, etc.) from each conversation involving virtual agent 112. Chat transcript history 212 may be stored as a single file or a collection of files, and may be stored on a local computing device, on a server, or in the cloud. Chat transcript history 212 may also be anonymized in implementations, such as by removing or masking personally identifiable information or other sensitive information. Information in chat transcript history 212 may also be purged or deleted based at least on an age of transcripts contained therein, such as to comply with one or more privacy regulations.

Chat transcript history 212 may include a set of queries provided by users of agent interaction interface 104 to virtual agent 112, where a query represents a request or a question intended to solicit a response from the agent. In examples, virtual agent 112 may determine whether a received query aligns with an authored topic (e.g., based on a vector representation of the query).

The set of queries in chat transcript history 212 may also include a set of unhandled queries 214. Unhandled queries 214 include queries (e.g., user queries provided via agent interaction interface 104) for which virtual agent 112 did not identify a matching (e.g., aligning) topic. For instance, as discussed above, conversational AI system 110 may be configured to apply a language model to each received user query and generate a similarity score between the user query and one or more matching trigger phrases (or topics). For similarity scores above a threshold, conversational AI system 110 may determine that a topic aligns with the received user query, causing virtual agent 112 to initiate or continue a conversation with the user based on the identified topic. For similarity scores below this threshold (or below a separate threshold), conversational AI system 110 may determine that no topic defined therein aligns with the received user query. Such queries for which no topic is determined as aligning, either identically or semantically (i.e., queries for which the bot did not identify a corresponding topic), may be referred to as an unhandled query. Unhandled queries 214 may be included within chat transcript history 212 (e.g., as part of an original chat transcript that may contain queries for which the bot identified an aligning topic), or may be stored as a separate set of information (e.g., unhandled queries 214 may be extracted from a larger chat transcript history in real-time or after a chat session has concluded, and stored separately).

In some implementations, chat analyzer 216 may be configured to receive 230 chat transcript history 212 analyze it to identify and/or store the set of unhandled queries from a larger transcript that also contains queries that were handled, as described herein. For instance, chat analyzer 216 may generate a vector representation for each query in chat transcript history 212 and determine whether the query has measure of similarity (e.g., a cosine similarity) with at least one trigger phrase that exceeds a threshold value. For queries that do not have a measure of similarity with any of the trigger phrases that exceeds a threshold value (i.e., the query does not align with any topic), chat analyzer 216 may identify the query as an unhandled query and/or store the unhandled query in the set of unhandled queries 214.

While chat analyzer 216 is depicted in FIG. 2 as being separate topic suggestion system 116, such an arrangement is only intended to be illustrative. In some implementations, chat analyzer 216 may also be implemented as part of topic suggestion system 116 (e.g., as part of query representation generator 202, or as a separate component). Accordingly, in some implementations, topic suggestion system 116 may include a chat analyzer to analyze prior chat sessions between users and virtual agent 112 and identify a set of unhandled queries from transcripts of those prior chat sessions. In one example embodiment, chat analyzer 216 may be configured to run manually (e.g., triggered by a user through authoring tool 122 or any other suitable interface) and/or automatically run periodically (e.g., once every hour, once every two hours, etc.) at a predetermined or user-specified timeframe. Chat analyzer 216 may scan through all new queries made since the analyzer last ran, and topic suggestion system 116 may group together queries to which were unable to be matched to an existing topic for presentation in a list as suggested topics (described in greater detail below).

In some implementations, topic suggestion system 116 and/or chat analyzer 216 may be configured to analyze prior chat transcripts and/or suggest new topics if a minimum number of new conversations (e.g., 100 new conversations) occurred since the last time a list of suggested topics was generated. In response to the minimum number of new conversations occurring, topic suggestion system 116 may be triggered to generate a new or updated list of suggested topics. In some further implementations, topic suggestion system 116 may be configured to provide suggestions in instances where a suggested topic was present in at least a minimum number of user sessions (e.g., a topic will be suggested if there are at least three user sessions in which queries relating to the suggested topic were unhandled). These examples are only illustrative, and it will be appreciated to those skilled in the art that other techniques may also be implemented.

Query representation generator 202 may be configured to obtain a set of queries that include the set of unhandled queries 214. For each unhandled query in the set of unhandled queries, query representation generator 202 may generate a vector representation (also referred to as a query representation) by applying language model 204 to the query. The representation may include any type of value that represents a meaning (e.g., a semantic meaning) of trigger phrase, such as a vector or other numerical representation (e.g., an array). In some implementations, the representation may comprise a vector in a multi-dimensional space. In this manner, query representation generator 202 may generate a set of unhandled query representations that comprises a vector representation for each unhandled query of the set of unhandled queries.

Language model 204 comprises one or more language models that may be used to generate a vector or other representation for a word or phrase. In some examples, language model 204 comprises an embedding model configured to generate an embedding. An embedding model may comprise a deep-learning model that may be configured to map a word or sequence of words to a numerical value, such as a multi-dimensional vector. The embedding model may be trained based on an algorithm that utilizes language data that comprises the usage of words in a given language, such as books, academic literature, dictionaries, encyclopedias, data available on the Internet, newspapers, other language models, and/or any other language data. In some implementations, the embedding model may be trained based on millions or billions of word or word combinations and comprise hundreds or even thousands of dimensions. It is noted that although certain examples are discussed herein that include generating an embedding based on an embedding model, embodiments are not limited to these examples. Query representation generator 202 may be configured to generate any other suitable type of representations (e.g., vectors) for each unhandled query of the set of unhandled queries 214.

Examples of algorithms that may be used to train and/or generate a language model 204 include, but are not limited to Word2Vec, designed by Google LLC, Global Vector (GloVe) designed by Stanford University, and fastText designed by Facebook, Inc. Furthermore, language model 204 may be trained using various types of learning techniques as will be appreciated by those skilled in the relevant arts, including but not limited to skip-gram, co-occurrence learning, negative sampling, etc. These examples are illustrative only and may include other algorithms for training language model 204, including any other natural language processing (NLP) or natural language understanding (NLU) methods appreciated to those skilled in the relevant arts.

Language model 204 may be generated in various forms. For instance, language model 204 may be generated by applying a suitable supervised and/or unsupervised machine-learning algorithm. For instance, language model 204 may be generated by implementing a vector space learning algorithm to generate the embedding model as a vector space model. As a vector space model, language model 204 may represent individual words or sequences of words in a continuous vector space (e.g., a multi-dimensional space), where similar words or sequences of words are mapped to nearby points or are embedded near each other. Furthermore, an artificial neural network learning algorithm may be used to generate and/or train language model 204 as a neural network that is an interconnected group of artificial neurons. The neural network may be presented with word or sequence of words to identify a representation of the inputted word or sequences of words. Language model 204 could be implemented using any suitable neural network architecture.

When query representation generator 202 applies an unhandled query to language model 204, query representation generator 202 generates a vector representation of the unhandled query. In this way, language model 204 may be applied by query representation generator 202 to generate a vector representation for a single word, a word span that comprises several words, or an entire sentence (e.g., by combining one or more representations for individual words in the trigger phrase) present in each unhandled query.

Query representation clusterer 206 may be configured to cluster the vector representations for the set of unhandled queries (i.e., the unhandled query representations) into one or more clusters of vector representations, where each cluster corresponds to a group of unhandled queries. In implementations, query representation clusterer 206 may implement one or more clustering algorithms, such as a density-based spatial clustering of applications with noise (DBSCAN) algorithm, a centroid clustering algorithm (e.g., k-means clustering), or other types of clustering algorithms configured to group data points into one or more clusters. In this manner, query representation clusterer 206 may generate a set of unhandled query clusters 208, where the set of unhandled query clusters comprises one or more clusters of vector representations for the unhandled queries. In examples, each separate cluster of query representations may represent or correspond to a group of the same or similar (e.g., semantically similar) unhandled queries.

Topic suggester 210 may be configured to generate, for each cluster, a corresponding suggested topic for implementation in conversational AI system 110 (e.g., for implementation in virtual agent 112 for future conversations). In some examples, topic suggester 210 may generate a list of suggested topics. Topic suggester 210 may generate each suggested topic based at least on unhandled query clusters 208. For instance, topic suggester 210 may generate a first topic associated with the first cluster, a second topic associated with a second cluster, and so on. As each suggested topic will be associated with a particular cluster of vector representations, each suggested topic therefore will also be associated with the underlying unhandled queries corresponding to those vector representations belonging to each cluster. In this manner, once unresolved queries are clustered or grouped together, one or more suggested topics may be generated that may implemented by an author (e.g., a user of authoring tool 122), which may then be selected by virtual agent 112 in future conversations that comprise queries containing phrases that are the same or semantically similar as the previously unresolved queries corresponding to the cluster. While one or more suggested topics may be implemented based interaction with authoring tool 122, one or more suggested topics may also be implemented automatically.

In implementations, topic suggester 210 may provide each suggested topic (e.g., individually or as a list) to authoring tool 122. Authoring tool 122 may present one or more of the suggested topics and/or one or more interactive elements that, when selected, may enable an author to select any of the suggested topics for saving and/or implementation in virtual agent 112 (e.g., a bot). In some examples, authoring tool 122 may also comprise one or more interactive elements that enable any of the suggested topics to be edited in conversational AI system 110. In some implementations, authoring tool 122 may also enable a user to select a particular suggested topic and view one or more unhandled queries (or a summary or truncated list thereof) that did not trigger virtual agent 112 to select any topic for conversation (e.g., unhandled queries that contributed to the generation of that suggested topic). Authoring tool 122 may comprise an arrangement of elements in any suitable fashion to present information generated by topic suggestion system 116. For instance, authoring tool 122 may present a list of topic suggestions and associated information as a listing, a table, or any other data structure.

In this manner, topic suggestion system 116 may analyze chat transcripts to identify user queries that did not trigger a topic, and provide suggestions for new or additional topics that address those gaps. For example, in accordance with techniques described herein, if many users are provide queries relating to "Thanksgiving hours," but a corresponding topic for this phrase (or a semantically similar one) does not exist, topic suggestion system 116 may automatically suggest that this topic be created.

Topic suggestion system 116 may operate in various ways to suggest a topic in a messaging system. For instance, topic suggestion system 116 may operate according to FIG. 3.

Figure 3:
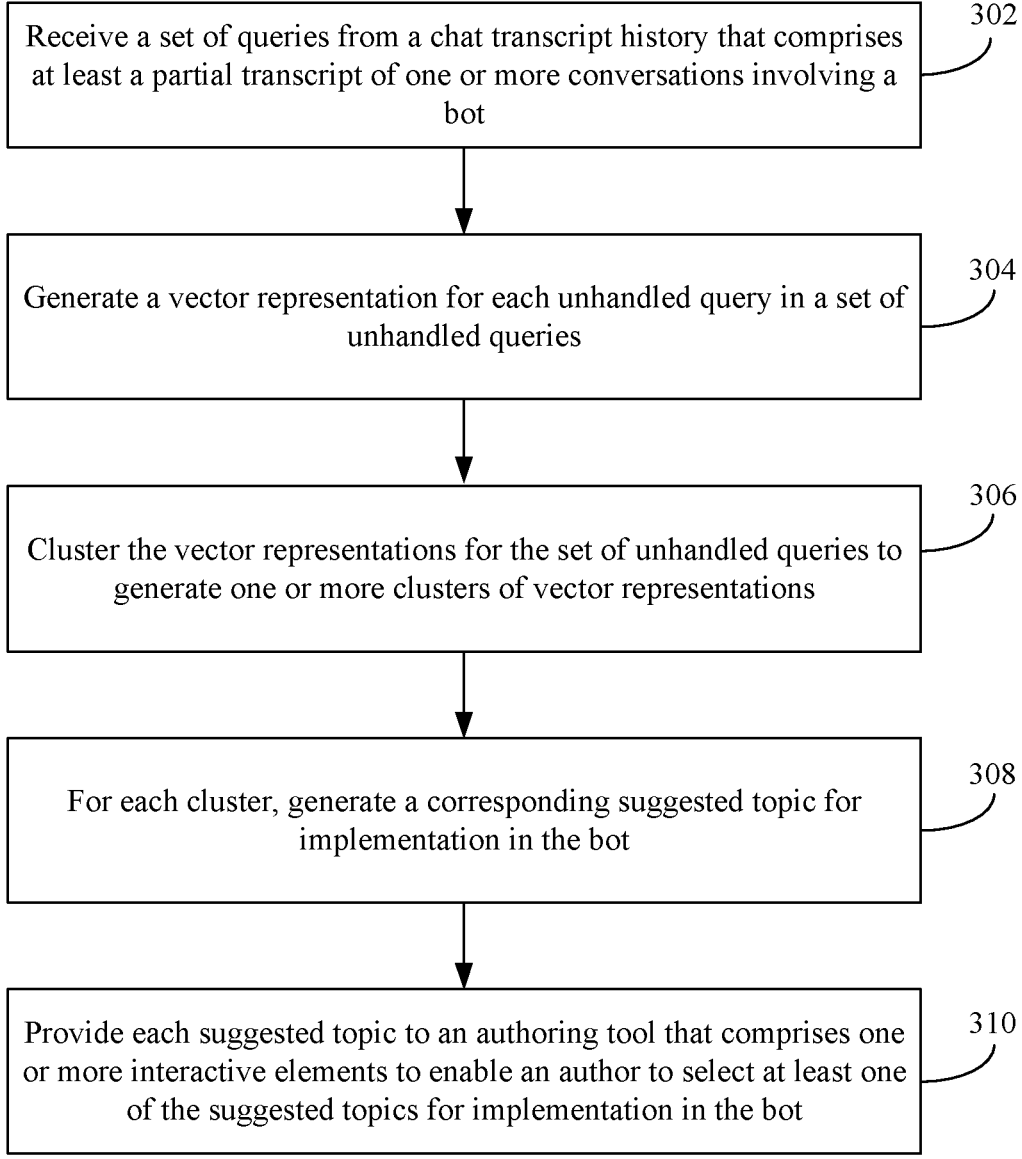
FIG. 3 shows a flowchart of a method for suggesting a topic in a messaging system, in accordance with an example embodiment.

FIG. 3 shows a flowchart 300 of a method for suggesting a topic in a messaging system, in accordance with an example embodiment. For illustrative purposes, flowchart 300 and topic suggestion system 116 are described as follows with respect to FIGS. 1 and 2. While example embodiments are described with respect to components of system 100, system 200, and flowchart 300, these examples are illustrative.

Flowchart 300 begins with step 302. In step 302, a set of queries is received from a chat transcript history that comprises at least a partial transcript of one or more conversations involving a bot. For instance, with reference to FIG. 2, query representation generator 202 may be configured to receive 218 a set of a set of queries from chat transcript history 212, where the set of queries comprises at least a partial transcript of one or more conversations between users of agent interaction interface 104 and a bot (e.g., virtual agent 112), as described herein. In examples, the set of queries received from chat transcript history 212 includes a set of unhandled queries 214, where each unhandled query in the set of unhandled queries comprises a query for which virtual agent 112 did not identify a corresponding topic for conversation. As described above, such an unhandled query may be determined based on generating a measure of similarity between a vector representation for each query and one or more trigger phrases that define topics for conversation. Where a query does not have a measure of similarity above a threshold with any of the trigger phrases, the query may be identified as an unhandled query.

In step 304, a vector representation is generated for each unhandled query in the set of unhandled queries. For instance, with reference to FIG. 2, query representation generator 202 may be configured to apply 220 language model 204 to each unhandled query in the set of unhandled queries 214 to generate a vector representation for each unhandled query, as described herein. The vector representation may comprise any numerical representation of each unhandled query, such as an embedding or other representation in a multi-dimensional space. In this manner, query representation generator 202 may be configured to generate a plurality of vector representations, each vector representation corresponding to an unhandled query of the set of unhandled queries 214.

In step 306, the vector representations for the set of unhandled queries are clustered to generate one or more clusters of vector representations. For instance, with reference to FIG. 2, query representation clusterer 206 may be configured to obtain 222 the set of vector representations from query representation generator 202 and cluster the set of vector representations to generate unhandled query clusters 208, as described herein. Unhandled query clusters 208 may comprise one or more clusters of vector representations, where each cluster corresponds to a group of unhandled queries.

Query representation clusterer 206 may cluster the vector representations for the set of unhandled queries by applying one or more clustering algorithms (e.g., an unsupervised clustering algorithm) to the vector representations. Using such algorithms, query representation clusterer 206 may identify vectors (each corresponding to an unhandled query) that are relatively close together in a vector space. In this manner, an unsupervised clustering algorithm may be configured to group together unhandled queries based on a semantic similarity of the unhandled queries to generate 224 a set of unhandled query clusters 208. In other words, each cluster of vector representations may correspond to a group of unhandled queries that are the same or similar in their semantic meaning. In some implementations, the selection and configuration (e.g., a relative closeness of data points that qualify as a cluster) of such algorithms may be provided via one or more interactive controls in authoring tool 122 (or any other interface not shown in which configuration controls for topic suggestion system 116 may be provided).

In step 308, a corresponding suggested topic for implementation in the bot is generated for each cluster. For instance, with reference to FIG. 2, topic suggester 210 may be configured to obtain 226 unhandled query clusters 208, and generate, for each cluster therein, a corresponding suggested topic for implementation in virtual agent 112, as described herein. The corresponding suggested topic may comprise one or more suggested trigger phrases that, if implemented, would define words or phrases that would cause virtual agent 112 to select the suggested topic during a conversation with a user. In implementations, a name of each suggested topic may be based on one or more queries that are at or near a center of the cluster associated with the suggested topic.

In step 310, each suggested topic is provided to an authoring tool that comprises one or more interactive elements to enable an author to select at least one of the suggested topics for implementation in the bot. For instance, with reference to FIG. 2, topic suggester 210 may be configured to provide 228 to authoring tool 122 an identification of each suggested topic (e.g., individually or as a list), as described herein. Authoring tool 122 may comprise or more interactive elements to enable an author to select at least one of the suggested topics for implementation in virtual agent 112. An illustrative example of authoring tool 122 is described below with reference to FIGS. 6 and 7.

In some implementations, authoring tool 122 may provide one or more interactive controls to edit the name of a suggested topic, delete a suggested topic from a list of suggested topics, and save the suggested topic for implementation in the bot such that when the bot subsequently receives a query that is the same or semantically similar with a trigger phrase associated with the suggested topic, the bot may select this topic (i.e., the newly added topic) for conversation. Authoring tool 122 may also provide one or more other interactive controls to view, create, rewrite, and/or remove one or more suggested trigger phrases associated with each suggested topic. In some other implementations, an interactive control may also be provided in authoring tool 122 to enable an author to add or merge the suggested topic with another topic (e.g., a suggested topic and/or an existing topic already implemented in conversational AI system 110).

Figure 4:
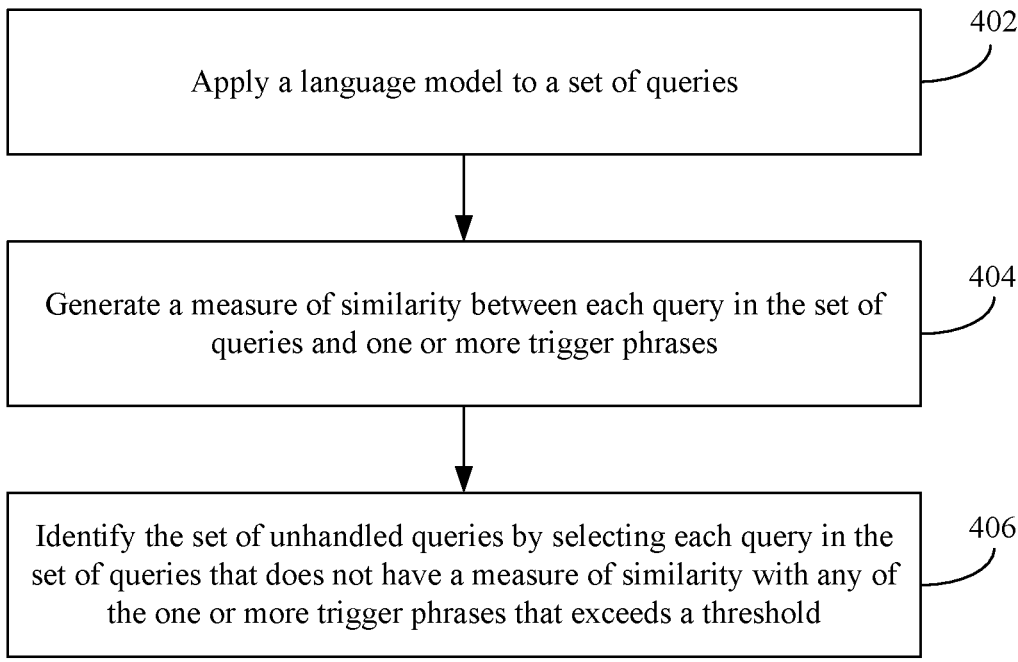
FIG. 4 shows a flowchart of a method for identifying a set of unhandled queries, in accordance with an example embodiment.

As discussed above, chat transcripts may be analyzed to identify a set of unhandled queries. For instance, FIG. 4 shows a flowchart 400 of a method for identifying a set of unhandled queries, in accordance with an example embodiment. In an implementation, the method of flowchart 400 may be implemented query representation generator 202 and/or chat analyzer 216. FIG. 4 is described with continued reference to FIGS. 1 and 2. Other structural and operational implementations will be apparent to persons skilled in the relevant art(s) based on the following discussion regarding flowchart 400, system 100 of FIG. 1, and system 200 of FIG. 2.

Flowchart 400 begins with step 402. In step 402, a language model is applied to a set of queries. For instance, with reference to FIG. 2, chat analyzer 216 may be configured to apply language model 204 (or one or more other language models not expressly illustrated) to a set of queries in chat transcript history 212 that both contains handled queries and unhandled queries. For each query, chat analyzer 216 may generate a vector representation in a similar manner as described herein.

In step 404, a measure of similarity is generated between each query in the set of queries and one or more trigger phrases. For instance, with reference to FIG. 2, chat analyzer 216 may generate a measure of similarity (e.g., based on a cosine similarity) between each query in chat transcript history 212 and one or more trigger phrases implemented in conversational AI system 110 that define topics for conversation. In some implementations, the measure of similarity may be based on vector representations for each query in chat transcript history 212 and vector representations for each of the one or more trigger phrases implemented in conversational AI system 110.

In step 406, the set of unhandled queries is identified by selecting each query in the set of queries that does not have a measure of similarity with any of the one or more trigger phrases that exceeds a threshold. For instance, with reference to FIG. 2, each query in the set of queries in chat transcript history 212 may have a measure of similarity for each of the one or more trigger phrases that define the selection of topics by the bot. For any queries that have a measure of similarity that exceeds a threshold with any trigger phrase, chat analyzer 216 may determine that the query was handled by virtual agent 112 (i.e., virtual agent 112 identified a topic that aligns with the query). For queries that do not have a measure of similarity that exceeds the threshold with any of the trigger phrases, chat analyzer 216 may determine that the query was not handled by virtual agent 112. Chat analyzer may select these unhandled queries and identify them as belonging to a set of unhandled queries 214.

In some implementations, each query that is identified as an unhandled query is stored in the set of unhanded queries 214 as part of chat transcript history 212. In some other implementations, chat analyzer 216 may identify each unhandled query in accordance with the disclosed techniques and provide each unhandled query to query representation generator 202. In some further implementations, such as where the functionality of query representation generator 202 and chat analyzer 216 may be combined, the same vector representations generated to identify the set of unhandled queries may be used for clustering and/or generating one or more suggested topics as described herein.

These techniques are only illustrative, and other techniques may be employed by chat analyzer 216 to identify unhandled queries in conversations between users of agent interaction interface 104 and virtual agent 112. In one example, unhandled queries may be identified in real-time or near real-time (e.g., as the chat session is occurring) by tagging or storing each query for which virtual agent 112 was not able to select a corresponding topic for conversation. In another example, chat transcript history 212 may be searched for certain words or phrases (e.g., a "Did you mean" prompt by virtual agent 112) to identify one or more unhandled queries. Each unhandled query may be tagged in a larger transcript that identifies other queries (e.g., handled queries), and/or may be stored in a separate transcript history or log that does not comprise queries for which the bot identified at least one corresponding topic for conversation (e.g., as a partial transcript of prior conversations).

Figure 5:
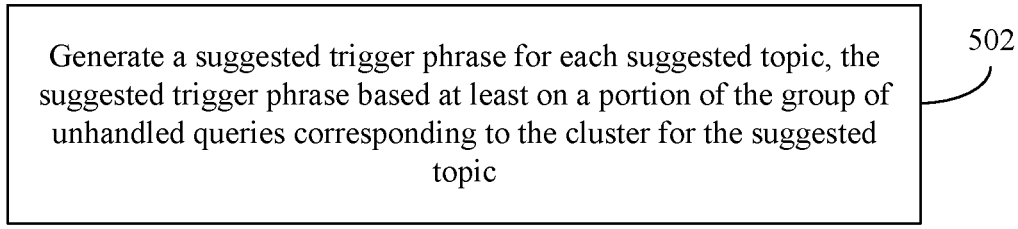
FIG. 5 shows a flowchart of a method for generating a suggested trigger phrase, in accordance with an example embodiment.

As discussed above, topic suggester 210 may propose one or more trigger phrases in connection with each suggested topic. For instance, FIG. 5 shows a flowchart 500 of a method for generating a suggested trigger phrase, in accordance with an example embodiment. In an implementation, the method of flowchart 500 may be implemented topic suggester 210. FIG. 5 is described with continued reference to FIGS. 1 and 2. Other structural and operational implementations will be apparent to persons skilled in the relevant art(s) based on the following discussion regarding flowchart 500, system 100 of FIG. 1, and system 200 of FIG. 2.

Flowchart 500 begins with step 502. In step 502, a suggested trigger phrase is generated for each suggested topic, the suggested trigger phrase based at least on a portion of the group of unhandled queries corresponding to the cluster for the suggested topic. For instance, with reference to FIG. 2, topic suggester 210 may identify one or more vector representations (and its corresponding unhandled queries from which the representation was generated) that belong to each cluster for a suggested topic. In this manner, topic suggester 210 may identify the group of unhandled queries that correspond to each cluster for a suggested topic.

Based at least on a portion of the group of unhandled queries (e.g., a single unhandled query in the group or multiple unhandled queries in the group), topic suggester 210 may generate one or more trigger phrases that, if implemented in the bot, would define the corresponding suggested topic. For instance, topic suggester 210 may generate a suggested trigger phrase by selecting one or more unhandled queries in the group and extracting words or phrases from those queries for the trigger phrase. In one example, a suggested trigger phrase may be generated based on one or more unhandled queries that are at or near a center of a cluster. In implementations, topic suggester 210 may also be configured to anonymize any personally identifiable or other sensitive information in queries when generating one or more trigger phrases.

Figure 6:
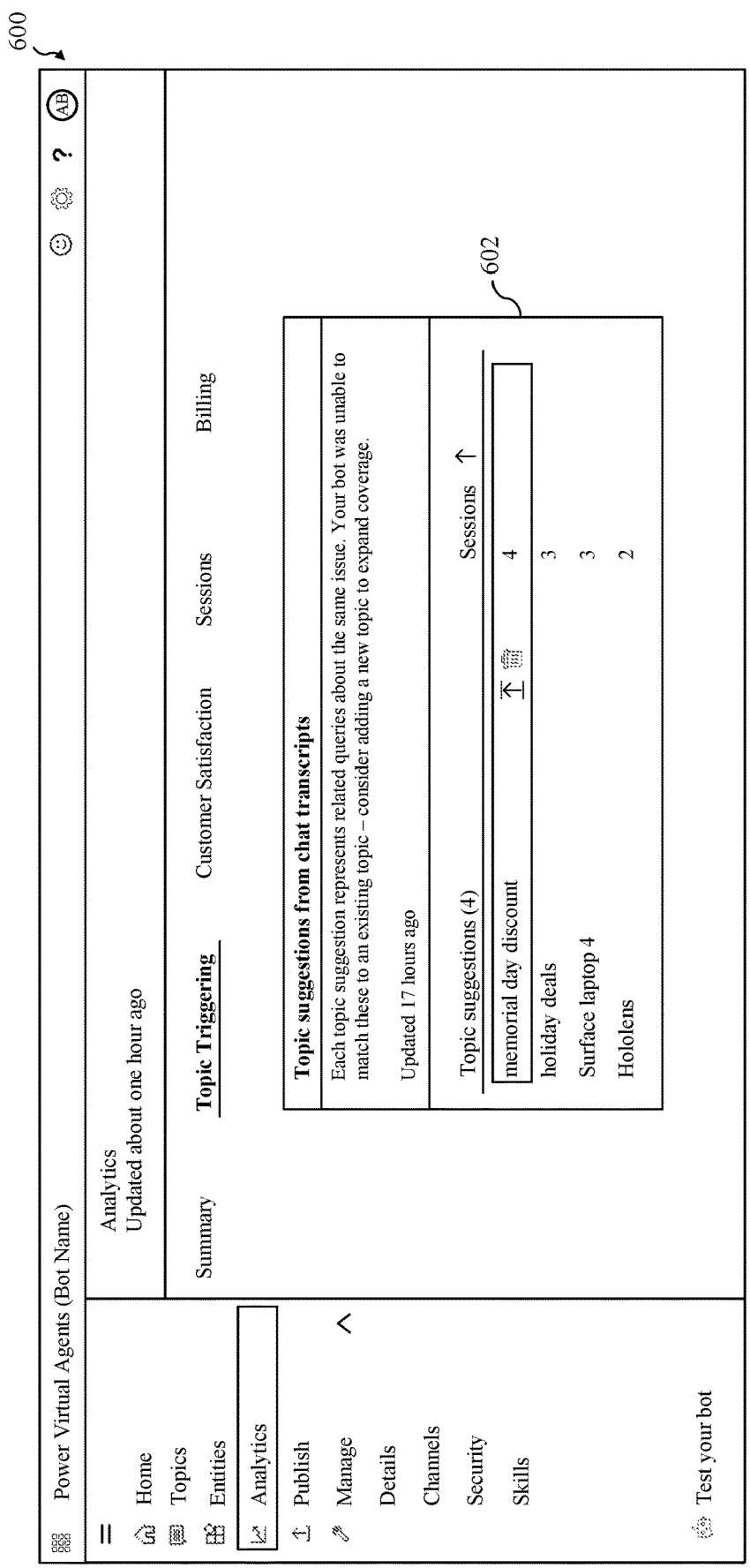
FIG. 6 shows an illustrative user interface for presenting topic suggestions, according to an example embodiment.

FIG. 6 shows an illustrative user interface 600 for presenting topic suggestions, according to an example embodiment. In examples, UI 600 may comprise one example implementation of authoring tool 122. For instance, in FIG. 6, a topic suggestion pane 602 may be presented that shows a list of suggested topics to include in conversational AI system 110 (e.g., which, if implemented, may be used by virtual agent 112 in future conversations). One or more of the topic suggestions generated by topic suggestion system 116 may be presented in the list along with a score. For instance, topic suggester 210 may provide each suggested topic to authoring tool 122 by assigning a score to each topic based at least on a number of sessions in which an unhandled query corresponding to the suggested topic was observed in a conversation involving the bot and/or number of times a query about each suggested topic was made by users of agent interaction interface 104. In such examples, topic suggester 210 may be configured to provide each suggested topic to authoring tool 122 as part of a list that ranks each suggested topic by its corresponding score. In other examples, authoring tool 122 may be provided with a list of suggested topics and a score (e.g., a number of sessions) for each suggested topic, such that authoring tool 122 may rank the suggested topics based on the received scores.

In some implementations, a subset of the suggested topics may be presented (e.g., the top 10 suggestions). Each topic suggestion shown in topic suggestion pane 602 may represent a topic that encompasses related queries about a same issue (e.g., category of conversations) for which the virtual agent was unable to match to an existing topic. In order to expand coverage of the virtual agent, one or more of the topic suggestions may be implemented in conversational AI system 110 by interacting with one or more interactive controls within UI 600 (e.g., clicking on a particular topic suggestion to view additional details and/or save the suggestion as a new or additional topic such that it is implemented in conversational AI system 110 for analyzing future conversations).

In topic suggestion pane 602, one or more interactive controls may also be present to enable selective filtering and/or sorting of the list of topic suggestions (e.g., sorting by number of sessions or topic name). In one implementation, the topic suggestion pane 602 may also include an indication of when a last update to the list of topic suggestions was generated, as shown in FIG. 6. In some implementations, topic suggestion pane 602 may include one or more elements for manually refreshing a topic suggestion list (e.g., by causing topic suggestion system 116 to regenerate a list of suggested topics for displaying in topic suggestion pane 602). In some other implementations, topic suggestion system 116 may be configured to automatically generate a list of one or more suggested topics (e.g., by performing any of steps of flowchart 300 automatically in the background) and/or provide each suggested topic to authoring tool 122 in response to a user selection of an element in topic suggestion pane 602 to initiate or trigger the display of such topics. In some other implementations, the list of topic suggestions may be presented upon a user launching topic suggestion pane 602. Other information and/or interactive controls may also be present, whether or not expressly shown in topic suggestion pane 602.

Figure 7:
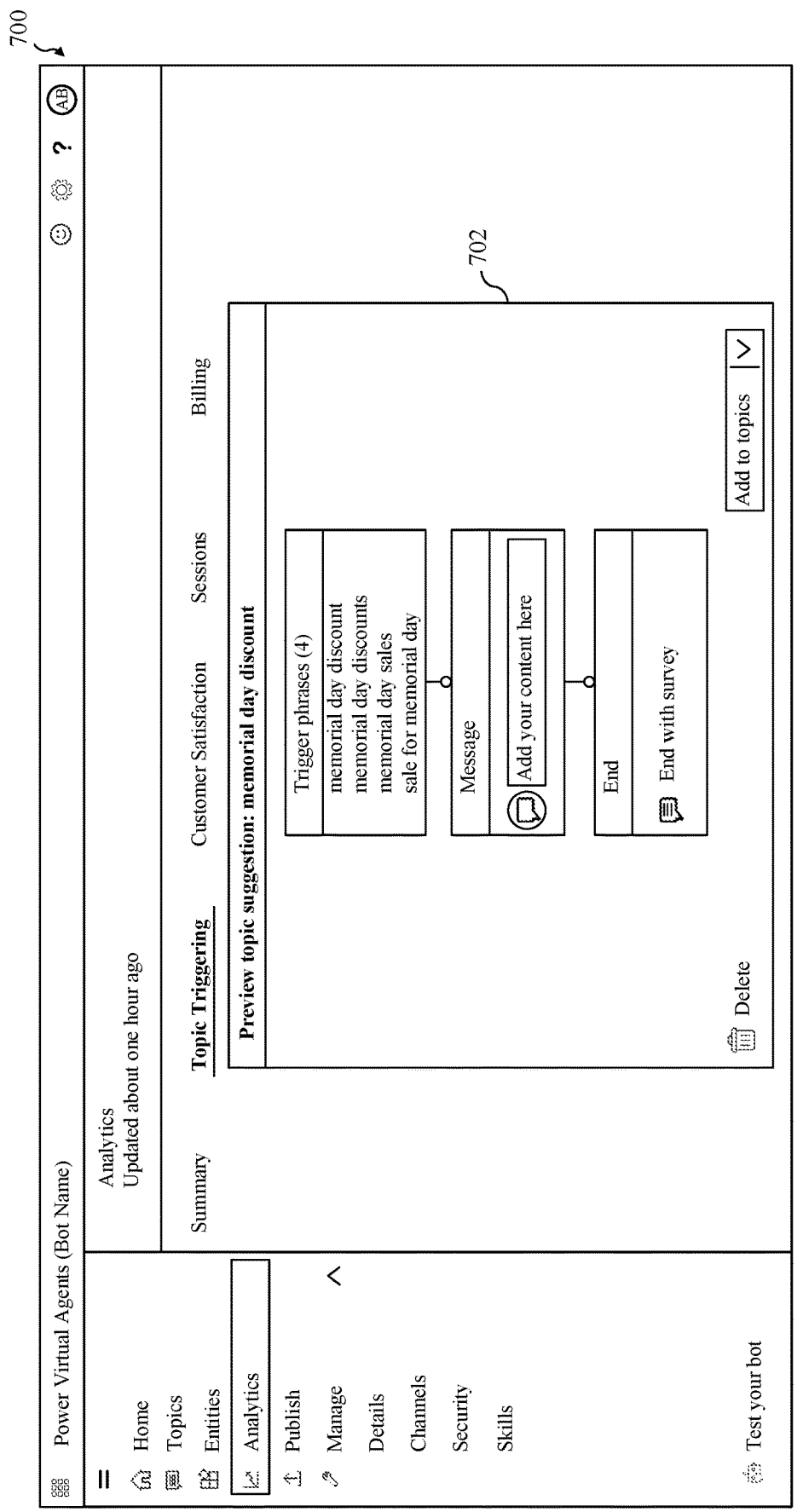
FIG. 7 shows an illustrative user interface for presenting topic suggestions, according to an example embodiment.

FIG. 7 shows an illustrative user interface 700 for presenting topic suggestions, according to an example embodiment. UI 700 may comprise another example implementation of authoring tool 122. UI 700 shows a selected topic suggestion pane 702, which may comprise an interface (e.g., a window, a pane, a pop-up, etc.) that appears upon selection of (e.g., clicking on) a specific topic suggestion within the topic suggestion list. As shown in selected topic suggestion pane 702, the one or more suggested trigger phrases provided by topic suggestion system 116 may also be presented therein. In examples, one or more suggested trigger phrases may be based on the cluster of vector representations corresponding to the unhandled queries observed from the chat transcripts (e.g., queries provided by users of the bot that were not matched to an existing topic). In some implementations, the suggested trigger phrases may be identical to one or more observed unhandled user queries associated with the suggested topic. For instance, a suggested trigger phrase may be provided based on identifying a vector representation that is at or near the center of the cluster corresponding to the suggested topic, and generating the suggested trigger based on the unhandled query associated with this vector representation. In some other implementations, the suggested trigger phrases may be generated by topic suggestion system 116 as semantically similar trigger phrases to one or more of such unhandled user queries observed from the chat transcript history. These examples are only illustrative, and suggested trigger phrases may be generated and provided in any other way that captures a semantic meaning of one or more unhandled queries based on the cluster corresponding to the suggested topic.

In selected topic suggestion pane 702, various interactive controls may be provided that enable customization of the suggested topic, such as renaming the suggested topic, rewriting (e.g., editing) or removing one or more suggested trigger phrases, adding additional trigger phrases, and/or removing (e.g., deleting) the suggested topic altogether (e.g., where an author determines that the suggested trigger phrase is not relevant, may not be useful, or otherwise need not be implemented in conversational AI system 110). Authoring tool 122 may also receive an indication, via interaction with an interactive control, to store (e.g., add) the suggested topic (defined by its associated trigger phrases) to an existing set of topics that are implemented in conversational AI system 110. In this manner, virtual agent 112 may access a full set of topics (which includes the new topic and any previously stored topics) in selecting a topic for conversation with a user in subsequent conversations. In some implementations, selected topic suggestion pane 702 may also provide interactive elements to view one or more of the actual user queries from the chat transcripts that contributed to the generation of the suggested topic, additional transcript text surrounding the user queries to provide context for the user queries, or any other information that may be relevant when reviewing and/or rewriting trigger phrases for suggested topics.

The arrangement of the interface in FIGS. 6 and 7 is illustrative only, and any suitable arrangement of information generated and/or described herein is contemplated. Further, UI 600 and/or UI 700 may contain one or more additional elements not shown. Examples of additional elements that can be presented therein include, but are not limited to, one or more tables, graphs, charts, etc. that may indicate historical and/or statistical information relating to prior user queries, such as a number or percentage of queries that were matched to a topic, queries that were matched to a plurality of possible topics, and/or queries that did not match with any topics.

III. Example Mobile and Stationary Device Embodiments

Computing device 102, agent interaction interface 104, computing device 108, conversational AI system 110, virtual agent 112, topic suggestion system 116, computing device 118, user interface 120, authoring tool 122, query representation generator 202, language model 204, query representation clusterer 206, unhandled query clusters 208, topic suggester 210, chat transcript history 212, unhandled queries 214, chat analyzer 216, UI 600, UI 700, flowchart 300, flowchart 400, and/or flowchart 500 may be implemented in hardware, or hardware combined with one or both of software and/or firmware. For example, computing device 102, agent interaction interface 104, computing device 108, conversational AI system 110, virtual agent 112, topic suggestion system 116, computing device 118, user interface 120, authoring tool 122, query representation generator 202, language model 204, query representation clusterer 206, unhandled query clusters 208, topic suggester 210, chat transcript history 212, unhandled queries 214, chat analyzer 216, UI 600, UI 700, flowchart 300, flowchart 400, and/or flowchart 500 may be implemented as computer program code/instructions configured to be executed in one or more processors and stored in a computer readable storage medium.

Alternatively, computing device 102, agent interaction interface 104, computing device 108, conversational AI system 110, virtual agent 112, topic suggestion system 116, computing device 118, user interface 120, authoring tool 122, query representation generator 202, language model 204, query representation clusterer 206, unhandled query clusters 208, topic suggester 210, chat transcript history 212, unhandled queries 214, chat analyzer 216, UI 600, UI 700, flowchart 300, flowchart 400, and/or flowchart 500 may be implemented as hardware logic/electrical circuitry.

For instance, in an embodiment, one or more, in any combination, of computing device 102, agent interaction interface 104, computing device 108, conversational AI system 110, virtual agent 112, topic suggestion system 116, computing device 118, user interface 120, authoring tool 122, query representation generator 202, language model 204, query representation clusterer 206, unhandled query clusters 208, topic suggester 210, chat transcript history 212, unhandled queries 214, chat analyzer 216, UI 600, UI 700, flowchart 300, flowchart 400, and/or flowchart 500 may be implemented together in a system on a chip (SoC). The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 8:
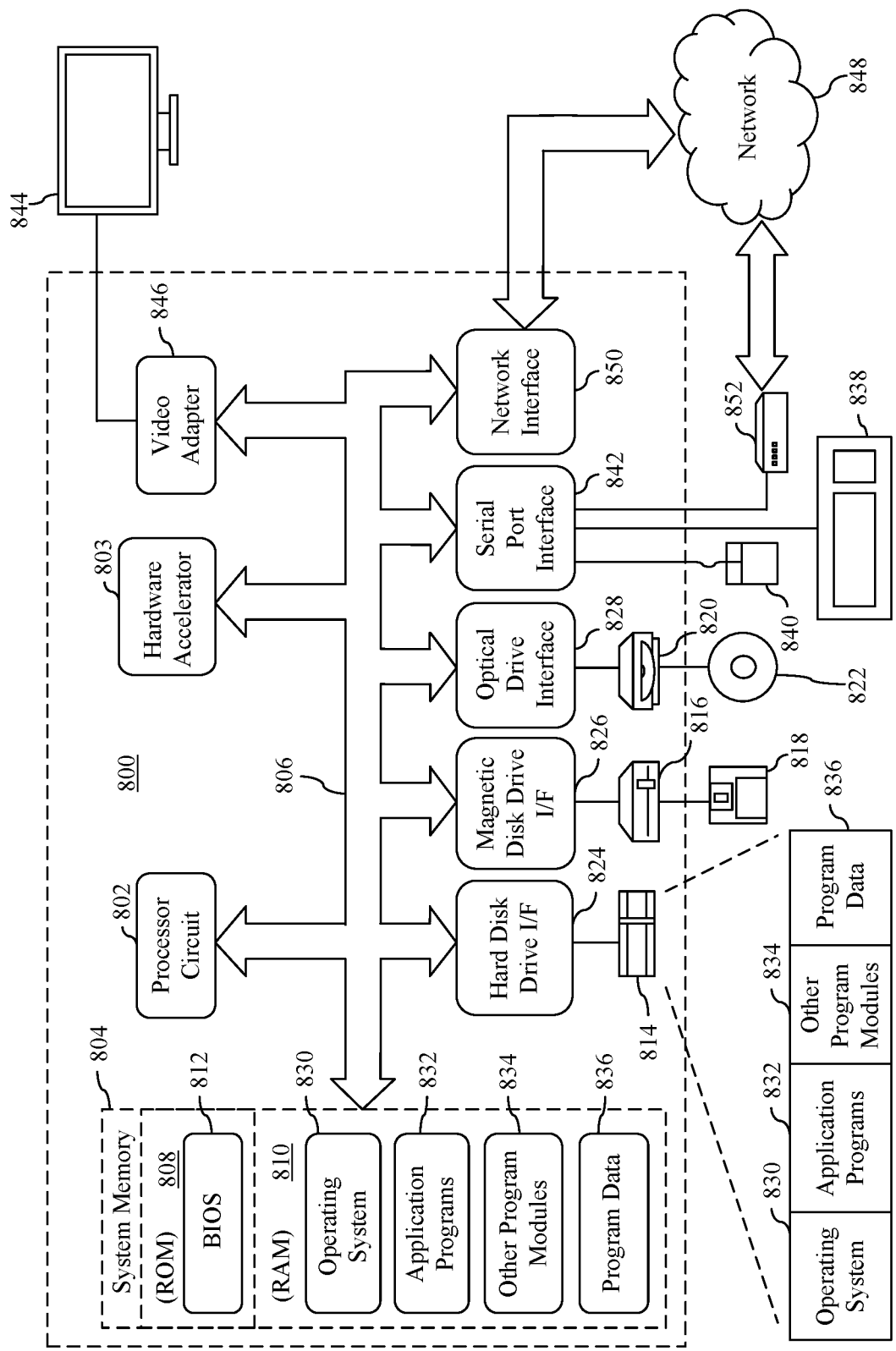
FIG. 8 shows a block diagram of an example computing device that may be used to implement example embodiments.

FIG. 8 depicts an exemplary implementation of a computing device 800 in which embodiments may be implemented. For example, computing device 102, agent interaction interface 104, computing device 108, conversational AI system 110, virtual agent 112, topic suggestion system 116, computing device 118, user interface 120, authoring tool 122, query representation generator 202, language model 204, query representation clusterer 206, unhandled query clusters 208, topic suggester 210, chat transcript history 212, unhandled queries 214, chat analyzer 216, UI 600, UI 700, flowchart 300, flowchart 400, and/or flowchart 500 (and/or any of the steps of flowcharts 300, 400, and/or 500) may be implemented in one or more computing devices similar to computing device 800 in stationary or mobile computer embodiments, including one or more features of computing device 800 and/or alternative features. The description of computing device 800 provided herein is provided for purposes of illustration, and is not intended to be limiting. Embodiments may be implemented in further types of computer systems, as would be known to persons skilled in the relevant art(s).

As shown in FIG. 8, computing device 800 includes one or more processors, referred to as processor circuit 802, a hardware accelerator 803, a system memory 804, and a bus 806 that couples various system components including system memory 804 to processor circuit 802 and hardware accelerator 803. Processor circuit 802 and/or hardware accelerator 803 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random-access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing any of the features of computing device 102, agent interaction interface 104, computing device 108, conversational AI system 110, virtual agent 112, topic suggestion system 116, computing device 118, user interface 120, authoring tool 122, query representation generator 202, language model 204, query representation clusterer 206, unhandled query clusters 208, topic suggester 210, chat transcript history 212, unhandled queries 214, chat analyzer 216, UT 600, UT 700, flowchart 300, flowchart 400, and/or flowchart 500 and/or further embodiments described herein.

A user may enter commands and information into computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with propagating signals and communication media (do not include propagating signals and communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 842, or any other interface type. Such computer programs, when executed or loaded by an application, enable computing device 800 to implement features of embodiments discussed herein. Accordingly, such computer programs represent controllers of the computing device 800.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

A system for suggesting a topic in a messaging system is disclosed herein. The system includes: at least one processor circuit; and at least one memory that stores program code configured to be executed by the at least one processor circuit, the program code comprising: a query representation generator configured to: receive a set of queries from a chat transcript history that comprises at least a partial transcript of one or more conversations involving a bot, wherein the set of queries includes a set of unhandled queries, and each unhandled query comprises a query for which the bot did not identify a corresponding topic, and generate a vector representation for each unhandled query in the set of unhandled queries; a query representation clusterer configured to cluster the vector representations for the set of unhandled queries to generate one or more clusters of vector representations, each cluster corresponding to a group of unhandled queries; and a topic suggester configured to: for each cluster, generate a corresponding suggested topic for implementation in the bot, and provide each suggested topic to an authoring tool, wherein the authoring tool comprises one or more interactive elements to enable an author to select at least one of the suggested topics for implementation in the bot.

In one implementation of the foregoing system, the chat transcript history does not comprise queries for which the bot identified at least one corresponding topic for conversation.

In another implementation of the foregoing system, the system comprises a chat analyzer configured to: apply a language model to the set of queries; generate a measure of similarity between each query in the set of queries and one or more trigger phrases; and identify the set of unhandled queries by selecting each query in the set of queries that does not have a measure of similarity with any of the one or more trigger phrases that exceeds a threshold.

In another implementation of the foregoing system, the query representation clusterer is configured to cluster the vector representations for the set of unhandled queries by applying an unsupervised clustering algorithm to the vector representations for the set of unhandled queries, the unsupervised clustering algorithm configured to group unhandled queries together based on a semantic similarity of the unhandled queries.

In another implementation of the foregoing system, the authoring tool is configured to receive an indication to store the at least one of the suggested topics in a set of topics for implementation in the bot, wherein the bot is configured to access the set of topics to select a topic of conversation with a user.

In another implementation of the foregoing system, the topic suggester is configured to generate the corresponding suggested topic for implementation in the bot for each cluster by generating a suggested trigger phrase for each suggested topic, the suggested trigger phrase based at least on a portion of the group of unhandled queries corresponding to the cluster for the suggested topic.

In another implementation of the foregoing system, the topic suggester is configured to provide each suggested topic to the authoring tool by: assigning a score to each topic based at least on a number of sessions in which an unhandled query corresponding to the suggested topic was observed in a conversation involving the bot; and providing each suggested topic to the authoring tool as part of a list that ranks each suggested topic by its corresponding score.

In another implementation of the foregoing system, the bot comprises a chat bot configured to simulate human conversation with a user.

In another implementation of the foregoing system, the vector representation comprises an embedding generated by applying a language model to each unhandled query in the set of unhandled queries.

A method for suggesting a topic in a messaging system is disclosed herein. The method includes: receiving a set of queries from a chat transcript history that comprises at least a partial transcript of one or more conversations involving a bot, wherein the set of queries includes a set of unhandled queries, and each unhandled query comprises a query for which the bot did not identify a corresponding topic; generating a vector representation for each unhandled query in the set of unhandled queries; clustering the vector representations for the set of unhandled queries to generate one or more clusters of vector representations, each cluster corresponding to a group of unhandled queries; for each cluster, generating a corresponding suggested topic for implementation in the bot; and providing each suggested topic to an authoring tool, wherein the authoring tool comprises one or more interactive elements to enable an author to select at least one of the suggested topics for implementation in the bot.

In one implementation of the foregoing method, the method comprises: applying a language model to the set of queries; generating a measure of similarity between each query in the set of queries and one or more trigger phrases; and identifying the set of unhandled queries by selecting each query in the set of queries that does not have a measure of similarity with any of the one or more trigger phrases that exceeds a threshold.

In another implementation of the foregoing method, the clustering the vector representations for the set of unhandled queries comprises applying an unsupervised clustering algorithm to the vector representations for the set of unhandled queries, the unsupervised clustering algorithm configured to group unhandled queries together based on a semantic similarity of the unhandled queries.

In another implementation of the foregoing method, the method comprises: receiving, via the authoring tool, an indication to store the at least one of the suggested topics in a set of topics for implementation in the bot, wherein the bot is configured to access the set of topics to select a topic of conversation with a user.

In another implementation of the foregoing method, the generating the corresponding suggested topic for implementation in the bot for each cluster comprises: generating a suggested trigger phrase for each suggested topic, the suggested trigger phrase based at least on a portion of the group of unhandled queries corresponding to the cluster for the suggested topic.

In another implementation of the foregoing method, the providing each suggested topic to the authoring tool comprises: assigning a score to each topic based at least on a number of sessions in which an unhandled query corresponding to the suggested topic was observed in a conversation involving the bot; and providing each suggested topic to the authoring tool as part of a list that ranks each suggested topic by its corresponding score.

In another implementation of the foregoing method, the bot comprises a chat bot configured to simulate human conversation with a user.

In another implementation of the foregoing method, the vector representation comprises an embedding generated by applying a language model to each unhandled query in the set of unhandled queries.

A computer-readable storage medium is disclosed herein. The computer-readable medium has program instructions recorded thereon that, when executed by at least one processor of a computing device, perform a method, the method comprising: receiving a set of queries from a chat transcript history that comprises at least a partial transcript of one or more conversations involving a bot, wherein the set of queries includes a set of unhandled queries, and each unhandled query comprises a query for which the bot did not identify a corresponding topic; generating a vector representation for each unhandled query in the set of unhandled queries; clustering the vector representations for the set of unhandled queries to generate one or more clusters of vector representations, each cluster corresponding to a group of unhandled queries; for each cluster, generating a corresponding suggested topic for implementation in the bot; and providing each suggested topic to an authoring tool, wherein the authoring tool comprises one or more interactive elements to enable an author to select at least one of the suggested topics for implementation in the bot.

In one implementation of the foregoing computer-readable storage medium, the method further comprises: applying a language model to the set of queries; generating a measure of similarity between each query in the set of queries and one or more trigger phrases; and identifying the set of unhandled queries by selecting each query in the set of queries that does not have a measure of similarity with any of the one or more trigger phrases that exceeds a threshold.

In another implementation of the foregoing computer-readable storage medium, the generating the corresponding suggested topic for implementation in the bot for each cluster comprises: generating a suggested trigger phrase for each suggested topic, the suggested trigger phrase based at least on a portion of the group of unhandled queries corresponding to the cluster for the suggested topic.

V. Conclusion

While various embodiments of the disclosed subject matter have been described above, it should be understood that they have been presented by way of example only, and not limitation. It should be understood by those skilled in the relevant art(s) that various changes in form and details may be made therein without departing from the spirit and scope of the application as defined in the appended claims. Accordingly, the breadth and scope of the disclosed subject matter should not be limited by any of the above-described example embodiments, but should be defined only in accordance with the following claims and their equivalents.

What is claimed is:

1. A system for suggesting a topic in a messaging system, the system comprising:
 a processor; and
 a memory device that stores program code structured to cause the processor to:
  receive a set of queries from a chat transcript history that comprises at least a partial transcript of one or more conversations involving a bot, wherein the set of queries includes a set of unhandled queries, and each unhandled query comprises a query for which the bot did not identify a corresponding topic;
  generate a vector representation for each unhandled query in the set of unhandled queries;
  cluster the vector representations for the set of unhandled queries to generate a plurality of clusters of vector representations, each cluster corresponding to a group of unhandled queries;
  for each cluster, generate a corresponding suggested topic for implementation in the bot;
  provide each suggested topic to an authoring tool, wherein the authoring tool comprises an interactive element to enable an author to select one of the suggested topics for implementation in the bot;
  implement the one of the suggested topics in the bot in response to a selection of the interactive element; and
  in a subsequent conversation involving the bot, select a particular topic of conversation from a list of topics that includes the one of the suggested topics.

2. The system of claim 1, wherein the chat transcript history does not comprise queries for which the bot identified at least one corresponding topic for conversation.

3. The system of claim 1, wherein the program code is further structured to cause the processor to:
 apply a language model to the set of queries;
 generate a measure of similarity between each query in the set of queries and one or more trigger phrases; and
 identify the set of unhandled queries by selecting each query in the set of queries that does not have a measure of similarity with any of the one or more trigger phrases that exceeds a threshold.

4. The system of claim 1, wherein the program code is structured to cause the processor to cluster the vector representations for the set of unhandled queries by applying an unsupervised clustering algorithm to the vector representations for the set of unhandled queries, the unsupervised clustering algorithm grouping unhandled queries together based on a semantic similarity of the unhandled queries.

5. The system of claim 1, wherein the authoring tool receives an indication to store the one of the suggested topics in the list of topics, wherein the bot accesses the list of topics to select the particular topic of conversation with a user.

6. The system of claim 1, wherein the program code is structured to cause the processor to generate the corresponding suggested topic for implementation in the bot for each cluster by generating a suggested trigger phrase for each suggested topic, the suggested trigger phrase based at least on a portion of the group of unhandled queries corresponding to the cluster for the suggested topic.

7. The system of claim 1, wherein the program code is further structured to cause the processor to provide each suggested topic to the authoring tool by:
- assigning a score to each topic based at least on a number of sessions in which an unhandled query corresponding to the suggested topic was observed in a conversation involving the bot; and
- providing each suggested topic to the authoring tool as part of a list that ranks each suggested topic by its corresponding score.

8. The system of claim 1, wherein the bot comprises a chat bot that simulates human conversation with a user.

9. The system of claim 1, wherein the vector representation comprises an embedding generated by applying a language model to each unhandled query in the set of unhandled queries.

10. A method for suggesting a topic in a messaging system, the method comprising:
- receiving a set of queries from a chat transcript history that comprises at least a partial transcript of one or more conversations involving a bot, wherein the set of queries includes a set of unhandled queries, and each unhandled query comprises a query for which the bot did not identify a corresponding topic;
- generating a vector representation for each unhandled query in the set of unhandled queries;
- clustering the vector representations for the set of unhandled queries to generate a plurality of clusters of vector representations, each cluster corresponding to a group of unhandled queries;
- for each cluster, generating a corresponding suggested topic for implementation in the bot;
- providing each suggested topic to an authoring tool, wherein the authoring tool comprises an interactive element to enable an author to select one of the suggested topics for implementation in the bot;
- implementing the one of the suggested topics in the bot in response to a selection of the interactive element; and
- in a subsequent conversation involving the bot, selecting a particular topic of conversation from a list of topics that includes the one of the suggested topics.

11. The method of claim 10, further comprising:
- applying a language model to the set of queries;
- generating a measure of similarity between each query in the set of queries and one or more trigger phrases; and
- identifying the set of unhandled queries by selecting each query in the set of queries that does not have a measure of similarity with any of the one or more trigger phrases that exceeds a threshold.

12. The method of claim 10, wherein the clustering the vector representations for the set of unhandled queries comprises applying an unsupervised clustering algorithm to the vector representations for the set of unhandled queries, the unsupervised clustering algorithm grouping unhandled queries together based on a semantic similarity of the unhandled queries.

13. The method of claim 10, further comprising:
- receiving, via the authoring tool, an indication to store the one of the suggested topics in the list of topics, wherein the bot accesses the list of topics to select the particular topic of conversation with a user.

14. The method of claim 10, wherein the generating the corresponding suggested topic for implementation in the bot for each cluster comprises:
- generating a suggested trigger phrase for each suggested topic, the suggested trigger phrase based at least on a portion of the group of unhandled queries corresponding to the cluster for the suggested topic.

15. The method of claim 10, wherein the providing each suggested topic to the authoring tool comprises:
- assigning a score to each topic based at least on a number of sessions in which an unhandled query corresponding to the suggested topic was observed in a conversation involving the bot; and
- providing each suggested topic to the authoring tool as part of a list that ranks each suggested topic by its corresponding score.

16. The method of claim 10, wherein the bot comprises a chat bot simulates human conversation with a user.

17. The method of claim 10, wherein the vector representation comprises an embedding generated by applying a language model to each unhandled query in the set of unhandled queries.

18. A computer-readable storage medium having program instructions recorded thereon that, when executed by at least one processor of a computing device, perform a method, the method comprising:
- receiving a set of queries from a chat transcript history that comprises at least a partial transcript of one or more conversations involving a bot, wherein the set of queries includes a set of unhandled queries, and each unhandled query comprises a query for which the bot did not identify a corresponding topic;
- generating a vector representation for each unhandled query in the set of unhandled queries;
- clustering the vector representations for the set of unhandled queries to generate a plurality of clusters of vector representations, each cluster corresponding to a group of unhandled queries;
- for each cluster, generating a corresponding suggested topic for implementation in the bot;
- providing each suggested topic to an authoring tool, wherein the authoring tool comprises an interactive element to enable an author to select one of the suggested topics for implementation in the bot;
- implementing the one of the suggested topics in the bot in response to a selection of the interactive element; and
- in a subsequent conversation involving the bot, selecting a particular topic of conversation from a list of topics that includes the one of the suggested topics.

19. The computer-readable storage medium of claim 18, wherein the method further comprises:
- applying a language model to the set of queries;
- generating a measure of similarity between each query in the set of queries and one or more trigger phrases; and
- identifying the set of unhandled queries by selecting each query in the set of queries that does not have a measure of similarity with any of the one or more trigger phrases that exceeds a threshold.

20. The computer-readable storage medium of claim 18, wherein the generating the corresponding suggested topic for implementation in the bot for each cluster comprises:
- generating a suggested trigger phrase for each suggested topic, the suggested trigger phrase based at least on a portion of the group of unhandled queries corresponding to the cluster for the suggested topic.

* * * * *